United States Patent
Doane et al.

(10) Patent No.: US 8,176,639 B2
(45) Date of Patent: May 15, 2012

(54) FILAMENT CLAMP FOR A VEGETATION TRIMMER

(76) Inventors: Ian J. Doane, Friendswood, TX (US);
James C. Doane, Friendswood, TX (US)

( * ) Notice: Subject to any disclaimer, the term of this patent is extended or adjusted under 35 U.S.C. 154(b) by 363 days.

(21) Appl. No.: 12/465,730

(22) Filed: May 14, 2009

(65) Prior Publication Data

US 2010/0287780 A1    Nov. 18, 2010

(51) Int. Cl.
*A01D 34/416* (2006.01)
(52) U.S. Cl. .............................. 30/276; 30/347; 56/12.7
(58) Field of Classification Search .................. 30/276, 30/347; 56/12.7
See application file for complete search history.

(56) References Cited

U.S. PATENT DOCUMENTS

| | | | | |
|---|---|---|---|---|
| 3,708,967 | A * | 1/1973 | Geist et al. ...................... | 56/12.7 |
| 4,035,912 | A * | 7/1977 | Ballas et al. ..................... | 30/276 |
| 4,047,299 | A | 9/1977 | Bair | |
| 4,104,797 | A * | 8/1978 | Ballas .............................. | 30/276 |
| 4,244,103 | A * | 1/1981 | Snarr ............................... | 30/276 |
| 4,269,372 | A * | 5/1981 | Kwater ....................... | 242/129.8 |
| 4,272,201 | A | 6/1981 | Steger | |
| 4,352,243 | A * | 10/1982 | Lombard ......................... | 30/276 |
| 4,411,069 | A * | 10/1983 | Close et al. ..................... | 30/276 |
| 4,475,287 | A * | 10/1984 | Beihoffer ........................ | 30/276 |
| 4,524,515 | A | 6/1985 | Oberg | |
| 4,633,588 | A | 1/1987 | Pittinger, Jr. | |
| 4,656,739 | A | 4/1987 | Pittinger, Jr. | |
| 5,020,223 | A | 6/1991 | Desent et al. | |
| 5,339,526 | A | 8/1994 | Everts | |
| 5,749,148 | A * | 5/1998 | White et al. ..................... | 30/276 |
| 5,809,655 | A * | 9/1998 | Houben et al. .................. | 30/276 |
| 5,887,348 | A * | 3/1999 | Iacona et al. ................... | 30/276 |
| 5,987,756 | A | 11/1999 | Yates et al. | |
| 6,094,823 | A | 8/2000 | Brown et al. | |
| 6,952,877 | B2 * | 10/2005 | Pfaltzgraff ...................... | 30/276 |
| 7,111,403 | B2 | 9/2006 | Moore | |
| 7,640,668 | B2 * | 1/2010 | Iacona ............................ | 30/276 |
| 7,966,736 | B2 * | 6/2011 | Arnetoli .......................... | 30/276 |
| 8,001,694 | B2 * | 8/2011 | Sing et al. ....................... | 30/276 |

\* cited by examiner

*Primary Examiner* — Hwei C Payer
(74) *Attorney, Agent, or Firm* — Steve Rosenblatt

(57) ABSTRACT

A vegetation trimmer with a spool and hub assembly has a cutting filament wound around the spool. The free end of the filament extends through an aperture in the hub into the cutting plane. The spool and hub are rotated at a high rate to allow the filament to cut vegetation. The spool includes a plurality of arms which engage with arms on the hub. When the spool is acted upon, the arms on the spool disengage with the arms on the hub to permit relative rotation of the spool to the hub to feed additional filament into the cutting plane. An indexing feature is used to regulate the amount of additional cutting filament that is allowed to be fed into the cutting plane. When the spool and hub are engaged, the cutting filament is forcible clamped between the arms on the spool and the arms on the hub to prevent the centrifugal force generated by the filament in the cutting plane from acting upon the filament wound around the spool at cutting speed so that the filament does not have means to tangle or weld together and break prematurely. Upon disengagement of the spool and hub, the cutting filament is released to permit the additional cutting filament to be fed into the cutting plane.

14 Claims, 5 Drawing Sheets

FILAMENT CLAMP FOR A VEGETATION TRIMMER

FIELD OF THE INVENTION

The present invention relates generally to line trimmers for cutting vegetation and, more particularly, relates to spools having filament wound thereon which are installed the hubs of trimmers.

BACKGROUND OF THE INVENTION

Vegetation trimmers are in common use to cut grass in areas that a mower typically does not reach such as along walkways, fences, and houses. Most trimmers comprise of a filament that is wound around a spool. When the spool is spinning at a high rate, the filament cuts vegetation. A common problem associated with this arrangement is that the force that is generated by the filament in the cutting plane is allowed to act on the filament wound around the spool, thus causing the filament to tangle and this does not permit more filament to pay out from the spool. The operator has to stop the trimmer and disassemble the hub and spool assembly to untangle the filament.

Fixed line trimmers have been developed to completely remove the problem of the filament tangling. The main drawback is that the operator has to stop the trimmer motor in order to refresh the filament multiple times as he is operating the trimmer, thus leading to a shortened life span of the trimmer due to constant starting and stopping of the motor and more time is required to trim an area of vegetation. Some fixed line trimmers use thicker filament than what is most commonly used so the filament does not wear down quickly, but the thicker filament cuts through objects such as exposed wires or wear down fences or walkways against which the operator is trimming. A common practice is to use an extended length of filament in order to increase the amount of vegetation that can be cut without having to refresh the filament, but this poses a serious safety hazard.

Some users of vegetation trimmers purchase pre-wound spools because the filament never tangles. However, the cost of the pre-wound spool is significantly greater than the filament itself. Also, more material is used to make the spool each time the filament runs out than replacing the filament itself. Another common practice is to use a special spool winding mechanism. With the spool winding mechanism, the filament is wound perfectly on the spool so that it does not tangle. The extra mechanism is more expensive to use rather than if the user was able to wind the filament himself. The present invention allows more room for error when the user winds the filament around the spool, thus eliminating the need for replacement of the entire spool or the use of a special spool winding mechanism when the filament runs out.

The present invention directly addresses the causes of the filament getting tangled on a bump feed type trimmer. The filament is clamped between the spool and the hub while the trimmer is running at cutting rpm in order to prevent the force from the filament in the cutting plane from acting on the filament wound around the spool. The spool holds a great length of filament and safely stores it inside the hub until it is fed into the cutting plane once the filament in the cutting plane is worn down.

SUMMARY OF THE INVENTION

A vegetation trimmer with a spool and hub is provided. The spool is rotationally locked relative to the hub in said first position and is allowed to rotate relative to the hub in said second position. At least one cutting filament is wound around the spool and extends radially outward into the cutting plane. The hub and spool are configured such that when the spool is in said first position, the cutting filament is clamped between the spool and the hub and when the spool is in said second position, the cutting filament is released from the clamp that was created by the hub and spool.

The spool and the hub cooperate with each other to clamp the cutting filament. This prevents the force that is generated by the filament in the cutting plane from acting upon the filament wound around the spool at cutting RPM. The filament is released when the spool is acted upon. This allows more cutting filament to easily pass through the aperture in the hub and into the cutting plane as the spool is being indexed to unwind more filament.

Preferably, the spool contains a plurality of projections which extend radially outward from the center of the spool and engage with projections on the hub to rotationally lock the spool. The projections on the hub are shaped to provide a surface to cooperate with the projections on the spool to clamp the cutting filament when the spool is in said first position. The projections on the hub also provide a surface to engage with the projections on the spool to rotationally lock the spool in said first position. When the spool is acted upon, it moves in an upward direction relative to the shaft and the projections on the spool are allowed to disengage from the projections on the hub to allow relative rotation between the spool and the hub to pay out more filament. Additional projections are provided on the hub to limit the amount of relative rotation allowed between the spool and the hub, thus indexing the amount of filament that is paid out from the spool.

The preferred embodiment provides a clamp to act as a retaining device. A retaining device is any device which prevents force on the filament in the cutting plane from being applied to the filament wound around the spool. Examples of other types of retaining devices are shown in FIGS. 4 and 5. In FIG. 4, the filament is retained by being pinched between the projections on the spool and the apertures in the hub. In FIG. 5, the filament is retained by the projections on the filament shouldering against the hub.

An object of this invention is to create a trimmer head and spool assembly in which the filament does not tangle or weld together. The amount of time that is necessary to cut an area of vegetation is significantly reduced because the operator does not need to disassemble and reassemble the hub and spool assembly except to add new filament when the old filament supply is exhausted.

Another object of the invention is to create a trimmer head and spool assembly in which the user can operate in a manner similar to that of the bump feed trimmers that are in common use. The clamp function works in conjunction with the bump feed system so the user does not have to activate the clamp by any means. Also, the clamp function works regardless of how the user winds the filament around the spool. This eliminates the need for special spool winding systems or the need to purchase pre-wound spools.

The following US patents are relevant to the inner workings of string line trimmers: U.S. Pat. No. 4,047,299; U.S. Pat. No. 4,272,201; U.S. Pat. No. 4,524,515; U.S. Pat. No. 4,633,588; U.S. Pat. No. 4,656,739; U.S. Pat. No. 5,020,223; U.S. Pat. No. 5,339,526; U.S. Pat. No. 5,987,756; U.S. Pat. No. 6,094,823 and U.S. Pat. No. 7,111,403.

DETAILED DESCRIPTION OF THE PREFERRED EMBODIMENT

Figure 1:
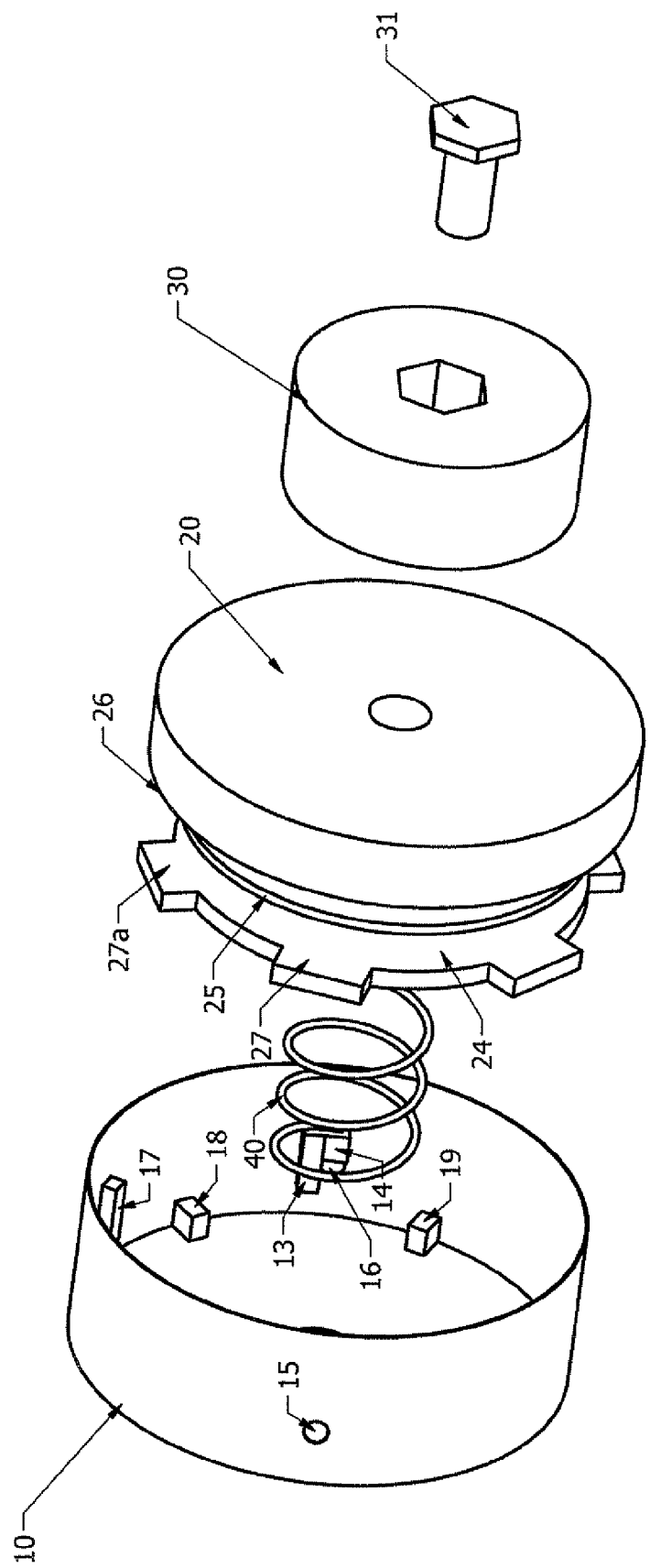
FIG. 1 is an exploded isometric view of the trimmer hub assembly.
Figure 2:
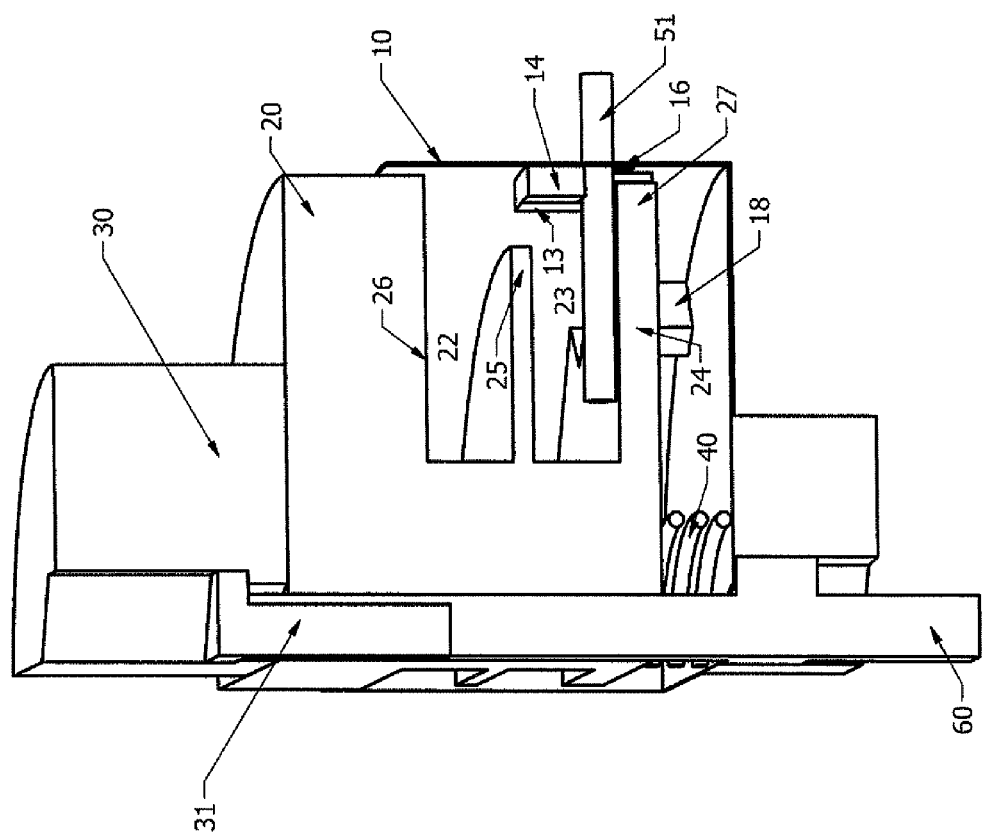
FIG. 2 is a cutaway view of the hub assembly in first position.

Referring to FIGS. 1 and 2, hub 10 is rotationally locked to shaft 60. Filament 51 is wound around spool 20 in cavity 23. Cavity 23 is created by walls 24 and 25. When assembled, filament 51 extends through aperture 16 see FIG. 1. When spool 20 is in second position, arm 19 engages momentarily with arm 27a to regulate the amount of relative rotation between hub 10 and spool 20. Cavity 22 is created by walls 25 and 26. Bolt 31 threads into shaft 60 to contain the entire assembly.

Referring now to FIG. 2, arm 13 rotationally locks arm 27 to prevent relative rotation between spool 20 and hub 10. Biasing member 40 normally biases arm 27 against arm 14 to forcibly clamp filament 51. When bumper sub 30 is struck against a hard surface, spool 20 enters into second position.

Figure 3:
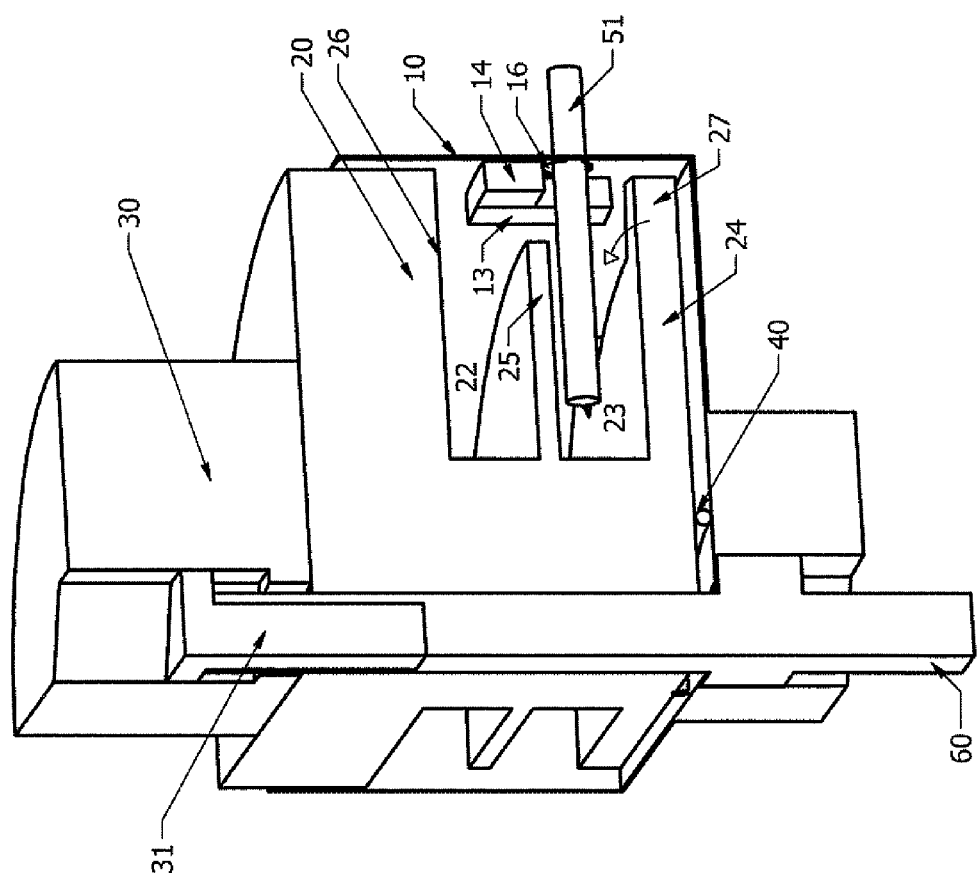
FIG. 3 is a cutaway view of the hub assembly in second position.

Referring now to FIG. 3, arm 27 is disengaged from arm 13. This allows spool 20 to rotate relative to hub 10 to allow filament 51 to unwind from spool 20. Further, arm 27 is separated from arm 14 which allows filament 51 to extend into the cutting plane as it unwinds from spool 20.

Referring now to FIG. 1, the filaments are wound around spool 20 and extend through apertures 15 and 16. During cutting, tab 27a rests against tab 17 to rotationally lock the spool and hub relative to each other. When the bumper sub 30 is struck against a hard surface, spool 20 moves inward and tab 27a no longer makes contact with tab 17, thus allowing relative rotation between hub 10 and spool 20 to feed additional filament. The relative rotation is regulated when tab 27a strikes tab arm 18. Arm 27 then comes to rest on tab 17 and this ends the feeding cycle.

Figure 4:
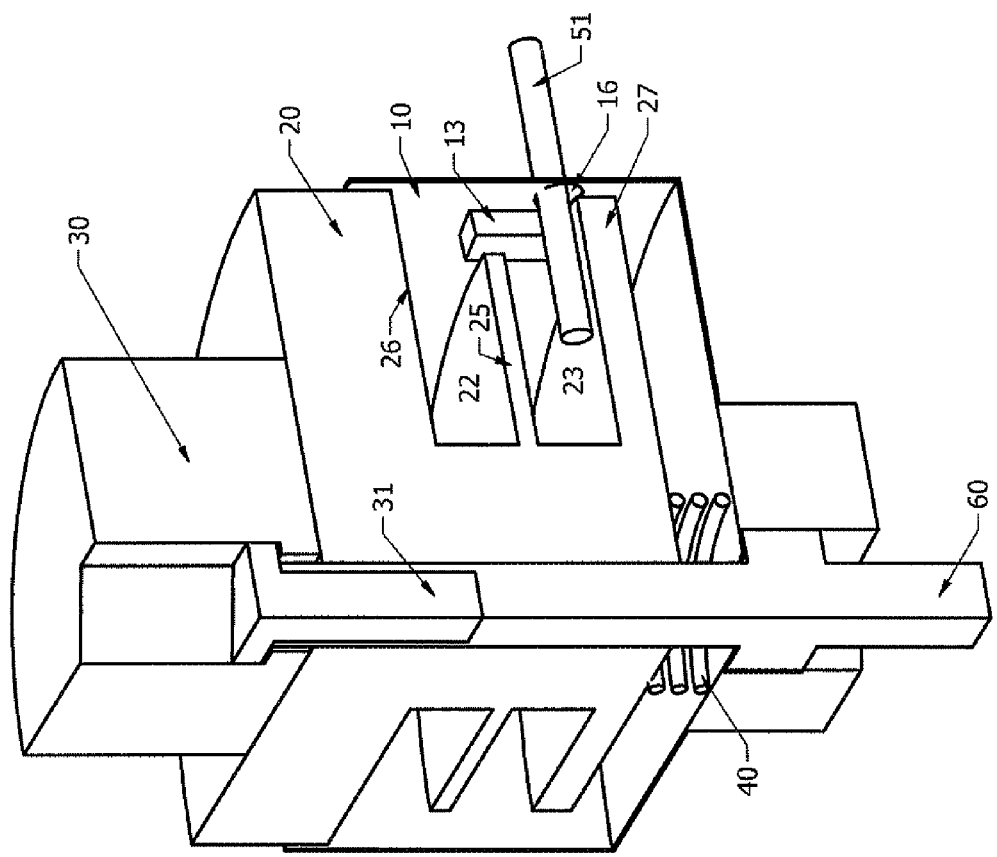
FIG. 4 is an alternative embodiment where the filament is pinched in the hub opening.

Referring now to FIG. 4, arm 13 rotationally locks arm 27 to prevent relative rotation between spool 20 and hub 10. Biasing member 40 normally biases arm 27 against filament 51 which is then biased against aperture 16 to prevent filament 51 from entering the cutting plane.

Based on the above description of FIG. 4, the spool contains a plurality of projections which extend radially outward and engage with projections on the hub to rotationally lock the spool. The projections on the spool engage with the filament to bend it at an acute angle to the aperture in the hub to prevent the force in the cutting plane from acting upon the filament wound around the spool. When the spool is acted upon, it moves in an upward direction and the filament is no longer bent at an angle and is able to pass through the aperture in the hub and into the cutting plane.

Figure 5:
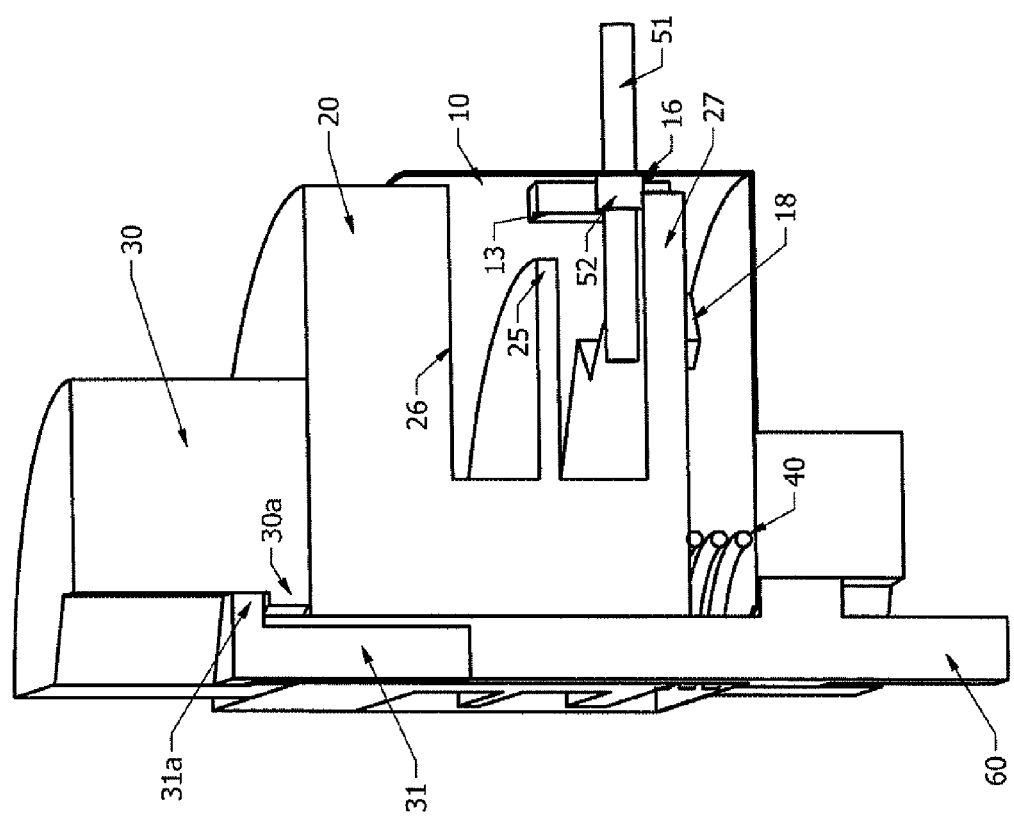
FIG. 5 is a variation of FIG. 4 showing a movable hub projection interacting with projections on the filament to regulate the payout of filament.

Referring now to FIG. 5, arm 13 rotationally locks arm 27 to prevent relative rotation between spool 20 and hub 10. Biasing member 40 normally biases arm 27 against filament 51. The biasing member is regulated by the thickness of disc 30a and the thickness of projection 31a to prevent the filament 51 from being clamped between arm 27 and aperture 16. Projection 52 shoulders against hub 10 to prevent filament 51 wound around spool 20 from entering the cutting plane. Based on the above description of FIG. 5, there are projections on the filament to shoulder against the hub when the spool is in the first position. When the spool is in the first position, the tab on the spool covers part of the aperture in the hub through which the filament passes through such that the projections on the filament are not allowed to pass through the aperture in the hub. As a result, the projections shoulder against the hub. When the spool is acted upon, it moves in an upward direction and the projections on the spool no longer covers the aperture, and the projections are allowed to pass through the aperture in the hub.

The above description is illustrative of the preferred embodiment and many modifications may be made by those skilled in the art without departing from the invention whose scope is to be determined from the literal and equivalent scope of the claims below.

We claim:

1. A vegetation trimmer, comprising:
a hub and spool assembly having a hub and a spool and at least one filament extending from an opening in said hub for cutting vegetation when rotated;
a retaining device selectively engaged with said filament for preventing force on the filament in a cutting plane, where said filament is rotating at a cutting speed, from tightening said filament around said spool;
said retaining device retaining the filament between at least one arm on said hub and at least one arm on said spool, and said arm on said hub selectively locking said spool rotationally relative to said hub in a first position.

2. The vegetation trimmer of claim 1, wherein:
said retaining device prevents centrifugal force that is generated by said filament in said cutting plane from tightening said filament wound around the spool.

3. The vegetation trimmer of claim 1, wherein:
said filament is secured between the spool and the hub.

4. The vegetation trimmer of claim 3, further comprising:
an indexing feature to control the amount of the filament that is fed out of said assembly and into said cutting plane.

5. The vegetation trimmer of claim 1, wherein:
said filament is retained during cutting and released during feeding out of said assembly.

6. The vegetation trimmer of claim 1, wherein:
said at least one filament comprises a plurality of filaments extending from said assembly.

7. The vegetation trimmer of claim 1, wherein:
said at least one arm on said spool comprises a plurality of arms extending radially outward and said at least one arm on said hub comprising a plurality of hub arms, said arms on said spool selectively engage with said arms on said hub such that said spool is not permitted to rotate relative to said hub in said first position;
said filament is selectively clamped by said retaining device between said arms on said hub and said arms on said spool in said first position;
said arms on said hub and said spool assuming a second position where said spool moves axially along a shaft retaining said hub and said spool for relative axial movement to disengage said arms on the spool and said arms on said hub, whereupon said filament is released to further extend from said assembly as said spool is allowed to relatively rotate relative to said hub.

8. The vegetation trimmer of claim 7, further comprising:
an indexing feature to control the amount of the filament that is fed from said assembly into the cutting plane.

9. The vegetation trimmer of claim 8, wherein:
said arms on said spool are circumferentially spaced such that said arms on said spool present in succession to define multiple occurrences of said spool first position in retaining the filament due to the indexing of the spool.

10. The vegetation trimmer of claim 7, further comprising:
a bumper sub operatively connected to said spool to selectively move the spool into said second position.

11. The vegetation trimmer of claim 10, wherein:
impact of said bumper sub against a hard surface overcomes a biasing member and said spool moves axially relative to said hub and into said second position whereupon an indexing feature on said assembly controls the amount of relative rotation between the spool and the hub.

12. A vegetation trimmer, comprising:
a hub and spool assembly having a hub and a spool and at least one filament extending from an opening in said hub for cutting vegetation when rotated;
a retaining device selectively engaged with said filament for preventing force on the filament in a cutting plane, where said filament is rotating at a cutting speed, from tightening said filament around said spool;
said spool comprises a plurality of arms extending radially outward to selectively engage with arms on said hub such that said spool is not permitted to rotate relative to said hub in a first position;
said filament is selectively clamped by said retaining device between said arms on said hub and said arms on said spool in said first position;
said arms on said hub and said spool assuming a second position where said spool moves axially along a shaft retaining said hub and said spool for relative axial movement to disengage said arms on the spool and said arms on said hub, whereupon said filament is released to further extend from said assembly as said spool is allowed to relatively rotate relative to said hub;
a biasing member to keep said spool in said first position and selectively provide a force to said retaining device to retain said filament.

13. A vegetation trimmer, comprising:
a hub and spool assembly having a hub and a spool and at least one filament extending from an opening in said hub for cutting vegetation when rotated;
a retaining device selectively engaged with said filament for preventing force on the filament in a cutting plane, where said filament is rotating at a cutting speed, from tightening said filament around said spool;
said spool comprises a plurality of arms extending radially outward to selectively engage with arms on said hub such that said spool is not permitted to rotate relative to said hub in a first position;
said filament is selectively clamped by said retaining device between said arms on said hub and said arms on said spool in said first position;
said arms on said hub and said spool assuming a second position where said spool moves axially along a shaft retaining said hub and said spool for relative axial movement to disengage said arms on the spool and said arms on said hub, whereupon said filament is released to further extend from said assembly as said spool is allowed to relatively rotate relative to said hub;
said retaining device retains the filament between said arm on said hub and said arm on said spool and said arm on said hub selectively locking said spool rotationally relative to said hub in a first position.

14. A vegetation trimmer, comprising:
a hub and spool assembly having a hub and a spool and at least one filament extending from an opening in said hub for cutting vegetation when rotated;
a retaining device selectively engaged with said filament for preventing force on the filament in a cutting plane, where said filament is rotating at a cutting speed, from tightening said filament around said spool;
said spool comprises a plurality of arms extending radially outward to selectively engage with arms on said hub such that said spool is not permitted to rotate relative to said hub in a first position;
said filament is selectively clamped by said retaining device between said arms on said hub and said arms on said spool in said first position;
said arms on said hub and said spool assuming a second position where said spool moves axially along a shaft retaining said hub and said spool for relative axial movement to disengage said arms on the spool and said arms on said hub, whereupon said filament is released to further extend from said assembly as said spool is allowed to relatively rotate relative to said hub;
said at least one filament comprises a plurality of filaments extending through separate apertures in the hub;
each said filament selectively engageable by said arm on said hub and said arm on said spool for selective engagement to said assembly.

* * * * *